US010761839B1

(12) United States Patent
Migoya et al.

(10) Patent No.: US 10,761,839 B1
(45) Date of Patent: Sep. 1, 2020

(54) NATURAL LANGUAGE SEARCH ENGINE WITH A PREDICTIVE WRITING TOOL FOR CODING

(71) Applicant: Globant España S.A., Madrid (ES)

(72) Inventors: Martin Migoya, Buenos Aires (AR); Haldo Sponton, Montevideo (UY)

(73) Assignee: Globant España S.A., Buenos Aires (AR)

( * ) Notice: Subject to any disclaimer, the term of this patent is extended or adjusted under 35 U.S.C. 154(b) by 0 days.

(21) Appl. No.: 16/656,387

(22) Filed: Oct. 17, 2019

(51) Int. Cl.
| G06F 9/44 | (2018.01) |
| G06F 8/73 | (2018.01) |
| G06F 9/445 | (2018.01) |
| G06N 3/04 | (2006.01) |
| G06F 16/2452 | (2019.01) |
| G06F 16/22 | (2019.01) |
| G06F 16/23 | (2019.01) |
| G06N 3/08 | (2006.01) |
| G06F 40/30 | (2020.01) |

(52) U.S. Cl.
CPC ............ *G06F 8/73* (2013.01); *G06F 9/44526* (2013.01); *G06F 16/2228* (2019.01); *G06F 16/2379* (2019.01); *G06F 16/24522* (2019.01); *G06F 40/30* (2020.01); *G06N 3/0445* (2013.01); *G06N 3/084* (2013.01)

(58) Field of Classification Search
CPC ........................................................ G06F 8/73
See application file for complete search history.

(56) References Cited

U.S. PATENT DOCUMENTS

| 9,626,164 | B1 | 4/2017 | Fuchs |
| 2004/0267756 | A1 | 12/2004 | Bayardo et al. |
| 2005/0027674 | A1* | 2/2005 | Potter ................. G06F 16/2423 |
| 2007/0294264 | A1 | 12/2007 | Bayardo et al. |
| 2009/0193398 | A1* | 7/2009 | Mitchell .................... G06F 8/73 717/137 |
| 2009/0259651 | A1* | 10/2009 | Tankovich ............ G06F 16/951 |
| 2010/0106705 | A1* | 4/2010 | Rush ......................... G06F 8/36 707/709 |
| 2012/0158797 | A1 | 6/2012 | Hermanns et al. |
| 2013/0086097 | A1 | 4/2013 | Teichmann et al. |
| 2013/0218867 | A1 | 8/2013 | Deluca et al. |
| 2014/0214812 | A1 | 7/2014 | John |
| 2015/0026635 | A1 | 1/2015 | Gohr et al. |
| 2016/0196137 | A1 | 7/2016 | Allen et al. |
| 2016/0196204 | A1 | 7/2016 | Allen et al. |
| 2016/0350201 | A1 | 12/2016 | Greene et al. |

(Continued)

FOREIGN PATENT DOCUMENTS

WO 2019067374 A1 4/2019

OTHER PUBLICATIONS

Cambronero et al, "When Deep Learning Met Code Search", arXiv 1905.03813v2, Jun. 18, 2019.

(Continued)

*Primary Examiner* — Hang Pan
(74) *Attorney, Agent, or Firm* — Rowan TELS LLC

(57) ABSTRACT

A system including a source code classifier, a natural language classifier, and a search engine operative on a search engine index associating outputs of the source code classifier and the natural language classifier to match a natural language search query with at least one computer code section from a computer program.

18 Claims, 5 Drawing Sheets

(56) References Cited

U.S. PATENT DOCUMENTS

2017/0228639 A1*  8/2017  Hara .................. G06N 3/08
2018/0121434 A1   5/2018  Jiang et al.
2019/0095785 A1   3/2019  Sarkar et al.
2019/0303115 A1   10/2019 Kelly et al.

OTHER PUBLICATIONS

Atilim Güne Baydin, et al., Online Learning Rate Adaptation with Hypergradient Descent, Jun. 9, 2017.
Erik Linstead, et. al. Sourcerer: mining and searching internet-scale software repositories, Data Mining and Knowledge Discovery, Kluwer Academic Publishers, vol. 18, No. 2, Oct. 15, 2008, pp. 300-336.
International Search Report for PCT Application PCT/IB2019/059156, dated Apr. 21, 2020.
Jose Cambronero, et. al., When Deep Learning Met Code Search, Arxiv.org, Cornell University Library, 201 Olin Library Cornell University, Ithaca, NY 14853, May 9, 2019.
Written Opinion of the ISA for PCT Application PCT/IB2019/059156, dated Apr. 21, 2020.

* cited by examiner

NATURAL LANGUAGE SEARCH ENGINE WITH A PREDICTIVE WRITING TOOL FOR CODING

BACKGROUND

The disclosure is in the area of computer programming, or coding, specifically in the means to search and effectively retrieve relevant and useful sections of textual code via a personalized natural language search engine.

The task of writing computer code presents a number of challenges, not least the process of writing a series of precise instructions to be read, interpreted and/or compiled according to a series of software rules. "Software" refers to logic implemented as instructions to a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code. A variety of computer code languages have developed over time to meet particular software needs or requirements and must be thoroughly understood by practitioners for their programs to run properly. The knowledge base of said practitioners may be specific to a language, or span multiple languages, and relies on previously learned information about the structure, commands, conditionals, logic, data handling mechanisms, and so on, of each language.

Because writing computer code with only rudimentary background knowledge of a programming language is particularly challenging, reference libraries of subroutines, algorithms, and functions are often available to programmers both before and during the coding process. Said libraries, however, only provide syntax understandable to downstream processes (e.g., compilers, linkers and the like) when the code is converted to an executable computer application and must additionally be part of a programmer's personal knowledge base. Previously written computer source code—either from a database within an organization or a publicly available source—applicable to a specific code writing context may be available to a programmer willing to access said source code through reference documents, but said programmer must still have prior knowledge of how a computer code section ("snippet") applies to a given context and know that such context-specific code actually exists.

Without a means of accessing context-specific source code during the programming process, a programmer must therefore necessarily rely on personal knowledge and/or potentially laborious and time-intensive look-up methods. Moreover, a source code database from within the programmer's organization that could be useful in a particular context may be theoretically accessible, but a programmer must again know that such source code libraries exist and have prior knowledge of their applicability. Even then, the knowledge is bounded to the programmer or his/her group or organization.

An additional difficulty for programmers is the lack of organizational or industry customization of a source code database. Source code reference libraries may be available for various code-writing contexts, but these are often general in nature (e.g., commands or functions listed alphabetically or categorically organized) and further categorized by computer language type (e.g., C, Java, Python, etc.). Code previously written for specific functional purposes of an organization or industry may be available—but would once again rely on a programmer's prior knowledge and/or an additional search interface requiring specific input parameters. Even code with embedded descriptive comments would rely on an experienced programmer's knowledge of search terms.

Programmer experience, or lack thereof, therefore also affects an organization's overall speed, efficiency and accuracy of source code creation. Inexperienced programmers often require access to a more experienced colleague for some time in order to understand the code in a project before acquiring the capacity of adding value to a project. Experience also helps to form coding context associations, e.g., how sections of code relate to one another, and inexperienced programmers often need to make these mental associations from time-intensive practice, study, and/or mentorship.

A need therefore exists for a rapid, context-specific, relational, and customizable computer code location and retrieval mechanism. Augmented coding tools could enhance code development experience, increase coding speed and quality, and promote best practices in a specific context. Said tools could also be customized for different contexts and/or clients and be a significant advance in programmer training and contextual experience.

BRIEF SUMMARY

In order to address the challenges noted above, a system and method for a natural language search engine with a predictive writing tool for coding is disclosed.

According to the first aspect a system is disclosed comprising: a source code classifier; a natural language classifier; and a search engine operative on a search engine index associating outputs of the source code classifier and the natural language classifier to match a natural language search query with at least one code section in a computer program.

According to another aspect a method is disclosed comprising: generating a first embedding for source code; generating a second embedding for natural language word sequences; relating the first embedding and the second embedding to generate a search engine index; and operating a search engine on the search engine index to match a natural language search query with at least one code section of the source code.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
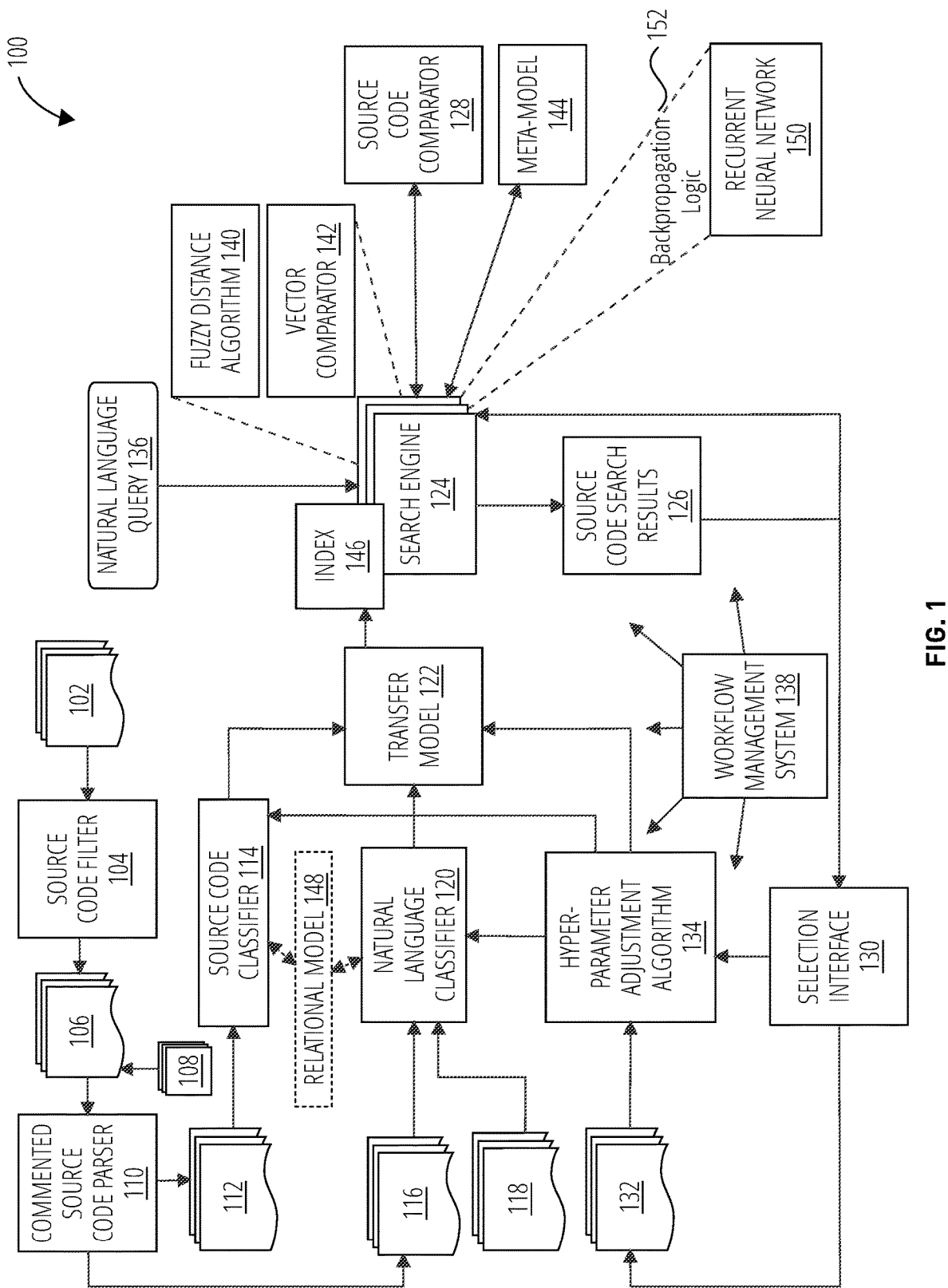
FIG. 1 depicts a system 100 in accordance with one embodiment.

"Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported.

"Backpropagation" refers to the central mechanism by which neural networks learn, e.g., the means of telling the neural network whether or not it made a mistake when it made a prediction.

"Comment" refers to a natural language phrase, sentence, paragraph, or other sequence of words that explains the function or purpose of a section of source code.

"Commented source code" refers to computer source code that includes embedded explanatory comments in a natural language. "Embedded" is not used here in the sense of embeddings used in a classifier. Comments in source code explain functionality or purpose of particular sections of the source code, such as functions, algorithms, Boolean or mathematical calculations, macros, subroutines, variables, loops, and conditions.

"Commented source code parser" refers to logic to operate on commented source code to extract and separate the comments from the source code.

"Compiled computer code" refers to object code or executable code derived by executing a source code compiler and/or subsequent tools such as a linker or loader.

"Compiler" refers to logic that transforms source code from a high-level programming language into object code or in some cases, into executable code.

"Computer code" refers to any of source code, object code, or executable code.

"Computer code section" refers to one or more instructions.

"Computer program" refers to another term for 'application' or 'app'.

"Cosine similarity algorithm" refers to a class of algorithms that measure of similarity between two non-zero vectors of an inner product space based on the cosine of the angle between the vectors. The cosine of 0° is 1, and it is less than 1 for any angle in the interval (0, π] radians. A cosine similarity algorithm thus generates a metric of relative vector orientation and not magnitude: two vectors with the same orientation have a cosine similarity of 1, two vectors oriented at 90° relative to each other have a similarity of 0, and two vectors diametrically opposed have a similarity of −1, independent of their magnitudes.

"Domain-specific comments" refers to Comments having a style, phrasing, word use, or other natural language properties that are specific to or predominant for a particular domain (company, business segment, person, developer group, type of application, etc.)

"Driver" refers to low-level logic, typically software, that controls components of a device. Drivers often control the interface between an operating system or application and input/output components or peripherals of a device, for example.

"Embedding" refers to the transformation of a representation of a data element (which may be a set) into a subgroup of a more extensive element. For example source code or natural language words sequences may be transformed into a multi-dimensional feature vector including labels for training a classifier.

"Euclidean distance algorithm" refers to a class of well-known vector comparator algorithms.

"Executable" refers to a file comprising executable code. If the executable code is not interpreted computer code, a loader is typically used to load the executable for execution by a programmable device.

"Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"File" refers to a unitary package for storing, retrieving, and communicating data and/or instructions. A file is distinguished from other types of packaging by having associated management metadata utilized by the operating system to identify, characterize, and access the file.

"Function" refers to a section of a program, a type of procedure or routine, that performs a specific task. Some programming languages make a distinction between a function, which returns a value, and a procedure, which performs some operation but does not return a value. However herein the term 'function' is used synonymously with 'subroutine.

"Functional distance" refers to a comparative metric between functional behavior expressed in a natural language and functional behavior indicated by the structure and content of source code.

"Fuzzy distance algorithm" refers to any of a class of well-known algorithms for calculating a similarity between fuzzy sets. A fuzzy set is a collection (e.g., a vector) in which elements are assigned a degree of membership, as opposed to binary membership criteria in which membership of an element in a set is either true or false. In classical set theory, the membership of elements in a set is assessed in binary terms according to a bivalent condition an element either belongs or does not belong to the set. By contrast, fuzzy sets admit the gradual assessment of the membership of elements in a set. The fuzzy sets are useful when information about elements' membership in the sets is incomplete or imprecise.

"Golden source code" refers to source code that has been selected by a user from a set of search results in response to a natural language search query. The combination of the natural language search query and selected source code may be utilized as a labeled data set for backpropagation learning on classifiers.

"Hyper-parameter" refers to an algorithm parameter which either determines the structure of classifiers (e.g., number of hidden layers in a neural network) or which determine how the classifier is trained (e.g., learning rate). In this disclosure, a distinction is made between adaptable hyper-parameters and static hyper-parameters, with the former being hyper-parameters that may adjusted based on user selections after the classifier is constructed, and the latter being static and non-adaptable once the classifier is constructed.

"Hyper-parameter adjustment algorithm" refers to an algorithm to perform a learning function to update adaptable hyper-parameters.

"Instructions" refers to symbols representing commands for execution by a device using a processor, microprocessor, controller, interpreter, or other programmable logic. Broadly, 'instructions' can mean source code, object code, and executable code. 'Instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Integrated development environment" refers to a software application that provides comprehensive facilities to computer programmers for software development. The term "integrated development environment" may be abbreviated as IDE. An IDE typically includes at least a source code editor, build automation tools (compiler, linker), and a debugger. Some advanced IDE's may include hardware components such as printed circuit boards for low-level debugging.

"Interpreted computer code" refers to instructions in a form suitable for execution by an interpreter.

"Interpreter" refers to logic that directly executes instructions written in a source code scripting language, without requiring the instructions to a priori be compiled into machine language. An interpreter translates the instructions into another form, for example into machine language, or into calls to internal functions and/or calls to functions in other software modules.

"KText" refers to a well-known open-source pre-processor that may be used to prepare the inputs to natural language classifiers. KText is a text processing program that uses the PC-KIMMO parser. KText generates a structured data set from natural language text where each word of the input text is represented as a record composed of several fields. Each word record contains a field for the original word, a field for the underlying or lexical form of the word, and a field for the gloss string.

"Library" refers to a collection of modules organized such that the functionality of all the modules may be included for use by software using references to the library in source code.

"Linker" refers to logic that inputs one or more object code files generated by a compiler or an assembler and combines them into a single executable, library, or other unified object code output. One implementation of a linker directs its output directly to machine memory as executable code (performing the function of a loader as well).

"Loader" refers to logic for loading programs and libraries. The loader is typically implemented by the operating system. A typical loader copies an executable into memory and prepares it for execution by performing certain transformations, such as on memory addresses.

"Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

"Machine language" refers to instructions in a form that is directly executable by a programmable device without further translation by a compiler, interpreter, or assembler. In digital devices, machine language instructions are typically sequences of ones and zeros.

"Meta-model" refers to a classifier trained on natural language search queries and search results for those queries selected by users.

"Module" refers to a computer code section having defined entry and exit points. Examples of modules are any software comprising an application program interface, drivers, libraries, functions, and subroutines.

"Natural language" refers to a communication language developed naturally in human societies (as contrasted with an artificial language or computer code).

"Natural language classifier" refers to a classifier algorithm configured to recognize and label human language constructs in natural language text.

"Natural language search query" refers to a query comprising one of more natural language fields submitted to a search engine.

"Object code" refers to the computer code output by a compiler or as an intermediate output of an interpreter. Object code often takes the form of machine language or an intermediate language such as register transfer language (RTL).

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Plug-in" refers to software that adds features to an existing computer program without rebuilding (e.g., changing or re-compiling) the computer program. Plug-ins are commonly used for example with Internet browser applications.

"Process" refers to software that is in the process of being executed on a device.

"Programmable device" refers to any logic (including hardware and software logic) who's operational behavior is configurable with instructions.

"Recurrent neural network" refers to a type of advanced artificial neural network that involves directed cycles in memory, with the ability to build on earlier types of networks with fixed-size input vectors and output vectors.

"Regression algorithm" refers to any of a class of well-known algorithms for estimating relationships between data elements, typically between one or more independent variable and a dependent variable. Examples include linear regression, regression trees, lasso regression, polynomial regression, and multivariate regression.

"Relational model" refers to a classifier algorithm that relates the predictions or classifications generated by two or more other classifiers.

"Search engine" refers to logic that matches a search query to search results and responds to the search query by returning search results to a source of the search query. A typical search engine applies the search query against a pre-generated search engine index. Many search engines and search algorithms are known and available in the art.

"Search engine index" refers to logic utilized by a search engine to match search queries to search results. A typical search engine index utilizes relational tables to match the search query to a set of search results based on data fields in the search query and linking or limiting Boolean or other qualifiers.

"Sequence-to-sequence algorithm" refers to an algorithm to convert sequential data from one form to another form. For example, a sequence-to-sequence algorithm may be utilized to convert a sequence of words from one natural language to another, or to convert a natural language sequence to a common format utilized by a transfer model algorithm.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Shared vector space" refers to a matrix or other data structure comprising vectors representing parameters from two different classification domains.

"Software" refers to logic implemented as instructions to a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"Source code" refers to a high-level textual computer language that requires either interpretation or compilation in order to be executed by a device.

"Source code classifier" refers to a classification algorithm that inputs source code and outputs one or more predicted label or class assigned to the source code.

"Source code comments" refers to natural language text associated with sections of source code in commented source code.

"Source code comparator" refers to an algorithm that computes a functional distance between two source code inputs.

"Source code filter" refers to an algorithm that generates a metric of the effectiveness of either or both of source code and commented source code for purposes of classifier training or learning.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Task" refers to one or more operations that a process performs.

"TensorFlow" refers to a well-known and available open-source software library for dataflow and differentiable programming across a range of tasks. It is a symbolic math library that is also used for machine learning applications such as neural networks.

"Torch" refers to a well-known and available open-source machine learning library, a scientific computing framework, and a script language based on the Lua programming language. It provides a wide range of algorithms for deep learning and uses the scripting language LuaJIT.

"Transfer learning" refers to an algorithm whereby a model trained for one type of classification is re-purposed or enhanced to provide a second related type of classification. Transfer learning involves the transfer of configuration settings (e.g., weights, adaptable hyper-parameters) for the previously learned classification to the second type.

"Transfer model" refers to a classifier trained to perform transfer learning on another classifier.

"Vector comparator" refers to an algorithm to generate a comparison metric between two vectors using a vector distance algorithm.

"Vector distance algorithm" refers to any of a class of algorithms for computing a similarity metric between two vectors. Vector distance algorithms typically generate a scalar "distance" value indicating a degree of feature separation between the vectors. Some vector distance algorithms may also generate another vector. Examples of vector distance algorithms are cosine similarity algorithms and Euclidean distance algorithms.

"Vector inner product" refers to an algorithm generating the product of the magnitudes of two vectors and the cosine of the angle between them.

"Visual relational tree" refers to a visual depiction on a machine display of a relational hierarchy between visual elements. The visual elements may be data fields, user interface controls, or combinations thereof.

"Workflow management system" refers to logic to control and coordinate the components of a machine system. The workflow management system (WMS) may be fully automated or in some cases may utilize human input to perform the control and coordination.

Referring to FIG. 1, a system 100 utilizing a natural language search engine with a predictive tool for coding is illustrated. "Search engine" refers to logic that matches a search query to search results and responds to the search query by returning search results to a source of the search query. A typical search engine applies the search query against a pre-generated search engine index. Many search engines and search algorithms are known and available in the art. "Search engine index" refers to logic utilized by a search engine to match search queries to search results. A typical search engine index utilizes relational tables to match the search query to a set of search results based on data fields in the search query and linking or limiting Boolean or other qualifiers. "Natural language" refers to a communication language developed naturally in human societies (as contrasted with an artificial language or computer code).

Model training begins with the ingest of unfiltered source code 102. A source code filter 104 performs the processes of text filtering and extraction to create commented source code 106, with extraneous text and characters (e.g., brackets, spaces, interchangeable data) removed. Generating the commented source code 106 includes recognizing comments, e.g., written descriptions embedded in the source code that do not contain executable instructions. "Executable" refers to a file comprising executable code. If the executable code is not interpreted computer code, a loader is typically used to load the executable for execution by a programmable device.

A commented source code parser 110 extracts the source code comments, retaining the source code 112 without said source code comments.

"Source code comments" refers to natural language text associated with sections of source code in commented source code. "Commented source code" refers to computer source code that includes embedded explanatory comments in a natural language. "Embedded" is not used here in the sense of embeddings used in a classifier. Comments in source code explain functionality or purpose of particular sections of the source code, such as functions, algorithms, Boolean or mathematical calculations, macros, subroutines, variables, loops, and conditions. "Loader" refers to logic for loading programs and libraries. The loader is typically implemented by the operating system. A typical loader copies an executable into memory and prepares it for execution by performing certain transformations, such as on memory addresses. "File" refers to a unitary package for storing, retrieving, and communicating data and/or instructions. A file is distinguished from other types of packaging by having associated management metadata utilized by the operating system to identify, characterize, and access the file.

Labels 108 are additionally added (e.g., by a trained human operator) to the commented source code 106 for supervised learning purposes. "Embedding" refers to the transformation of a representation of a data element (which may be a set) into a subgroup of a more extensive element. For example source code or natural language words sequences may be transformed into a multi-dimensional feature vector including labels for training a classifier. "Comment" refers to a natural language phrase, sentence, paragraph, or other sequence of words that explains the function or purpose of a section of source code.

The labels 108 may be added manually as input data for (supervised) model training for the downstream neural network. The commented source code parser 110, having removed the commented source code from the commented source code 106, retains the source code comments 116 as a separate input (e.g., vector) to train the natural language classifier 120.

In addition to source code comments 116, the natural language classifier 120 may also utilize domain-specific comments 118 for training. Domain-specific comments 118 comprise source code comments having a style, phrasing, word use, or other natural language properties that are specific to or predominant for a particular domain, e.g., a company or organization, and would be distinguished from non-specific source code comments 116. The natural language classifier 120 also utilizes outputs from a hyper-parameter adjustment algorithm 134, the latter initiated by, for example, user actions to a plug-in for an integrated development environment configured to interact with on one or more of the source code classifier 114, the natural language classifier 120, the transfer model 122, and a search engine 124.

"Integrated development environment" refers to a software application that provides comprehensive facilities to computer programmers for software development. The term "integrated development environment" may be abbreviated as IDE. An IDE typically includes at least a source code editor, build automation tools (compiler, linker), and a debugger. Some advanced IDE's may include hardware components such as printed circuit boards for low-level debugging. "Plug-in" refers to software that adds features to an existing computer program without rebuilding (e.g., changing or re-compiling) the computer program. Plug-ins are commonly used for example with Internet browser applications. "Computer program" refers to another term for 'application' or 'app'. "App" refers to a type of application with limited functionality, most commonly associated with applications executed on mobile devices. Apps tend to have a more limited feature set and simpler user interface than applications as those terms are commonly understood in the art.

Bridging the source code classifier 114 and natural language classifier 120, a relational model 148 may implement an algorithm relating the classifications generated by the source code classifier 114, the natural language classifier 120 and other additional classifiers. "Algorithm" refers to any set of instructions configured to cause a machine to carry out a particular function or process. Many such relational model 148 algorithms (e.g., regression algorithms, neural networks, etc.) are known and available to those skilled in the art. "Regression algorithm" refers to any of a class of well-known algorithms for estimating relationships between data elements, typically between one or more independent variable and a dependent variable. Examples include linear regression, regression trees, lasso regression, polynomial regression, and multivariate regression.

The hyper-parameter adjustment algorithm 134 utilizes inputs from the selection interface 130, comprising user computer code section selections, and from golden source code 132, comprising source code selected by a user from a set of search results in response to a natural language search query. "Natural language search query" refers to a query comprising one of more natural language fields submitted to a search engine.

The hyper-parameter adjustment algorithm 134 in one embodiment utilizes at least the following parameters as training workflow parameters, all familiar to those skilled in the art to process inputs to natural language classifiers: a sequence-to-sequence algorithm ("seq2seq"), a KText processor parameter, a FastAI model, a Split Train test, a Vocab parameter, and a Code To Embed ("code2emb") parameter. These parameters and their application are individually well known in the art and will not be elaborated on in further detail.

"KText" refers to a well-known open-source pre-processor that may be used to prepare the inputs to natural language classifiers. KText is a text processing program that uses the PC-KIMMO parser. KText generates a structured data set from natural language text where each word of the input text is represented as a record composed of several fields. Each word record contains a field for the original word, a field for the underlying or lexical form of the word, and a field for the gloss string. "Sequence-to-sequence algorithm" refers to an algorithm to convert sequential data from one form to another form. For example, a sequence-to-sequence algorithm may be utilized to convert a sequence of words from one natural language to another, or to convert a natural language sequence to a common format utilized by a transfer model algorithm. "Transfer model" refers to a classifier trained to perform transfer learning on another classifier.

"Transfer learning" refers to an algorithm whereby a model trained for one type of classification is re-purposed or enhanced to provide a second related type of classification. Transfer learning involves the transfer of configuration settings (e.g., weights, adaptable hyper-parameters) for the previously learned classification to the second type. "Hyper-parameter" refers to an algorithm parameter which either determines the structure of classifiers (e.g., number of hidden layers in a neural network) or which determine how the classifier is trained (e.g., learning rate). In this disclosure, a distinction is made between adaptable hyper-parameters and static hyper-parameters, with the former being hyper-parameters that may adjusted based on user selections after the classifier is constructed, and the latter being static and non-adaptable once the classifier is constructed. "Natural language classifier" refers to a classifier algorithm configured to recognize and label human language constructs in natural language text.

The transfer model 122 is a (e.g., relatively small) model specifically trained to utilize vectors from the natural language classifier 120 and the source code classifier 114 and facilitate a transfer and/or correlation of output predictions between the two models, for example by applying the labels 108 to associate one to the other. A standard neural network with a few dense layers, familiar to those skilled in the art, would be sufficient for this model. Output from the hyper-parameter adjustment algorithm 134 is may also be included as a transfer model 122 input.

A search engine index 146 associates outputs from the source code classifier 114 and natural language classifier 120 via the transfer model 122 and provides a dataset (e.g., relational tables and/or searchable index) to be utilized by the search engine 124. When a user submits a request the search engine 124 operates on the search engine index 146 to return source code search results 126 to the user. The selection interface 130 may be provided in an integrated development environment, wherein the search engine 124 would be activated via a plug-in by the user. User selections from the source code search results 126 may be utilized to train a meta-model 144, to update the golden source code 132, and to operate the hyper-parameter adjustment algorithm 134 on one or more of the source code classifier 114 and the natural language classifier 120. The hyper-parameter adjustment algorithm 134 may be automatically tuned during the user request/response process and the various feedback loops and components all coordinated via a workflow management system 138.

The search engine index 146 is continually updated based on user selections from the source code search results 126. The search engine 124 functionally matches a natural language query 136 with at least one computer code section and provides the matches in the form of the source code search results 126. The search engine 124 may identify the matching computer code sections based on a functional distance between the computer code sections the natural language search query. "Functional distance" refers to a comparative metric between functional behavior expressed in a natural language and functional behavior indicated by the structure and content of source code.

Source code may also compare a user-selected computer code section against the search engine index 146 using a source code comparator 128, which takes as input a selected code section, identifies related code sections, and returns the related code sections to the search engine 124 so as to update the search engine index 146 for better accuracy against future natural language queries.

In one embodiment the search engine 124 could comprise a vector comparator 142, using a vector distance algorithm as a means to compare distances for a vector derived from computer code sections and a natural language text vector.

"Vector distance algorithm" refers to any of a class of algorithms for computing a similarity metric between two vectors. Vector distance algorithms typically generate a scalar "distance" value indicating a degree of feature separation between the vectors. Some vector distance algorithms may also generate another vector. Examples of vector distance algorithms are cosine similarity algorithms and Euclidean distance algorithms. "Euclidean distance algorithm" refers to a class of well-known vector comparator algorithms. "Vector comparator" refers to an algorithm to generate a comparison metric between two vectors using a vector distance algorithm.

In another embodiment the search engine 124 could comprise a fuzzy distance algorithm 140 for keywords in a particular context. "Cosine similarity algorithm" refers to a class of algorithms that measure of similarity between two non-zero vectors of an inner product space based on the cosine of the angle between the vectors. The cosine of 0° is 1, and it is less than 1 for any angle in the interval (0, $\pi$] radians. A cosine similarity algorithm thus generates a metric of relative vector orientation and not magnitude: two vectors with the same orientation have a cosine similarity of 1, two vectors oriented at 90° relative to each other have a similarity of 0, and two vectors diametrically opposed have a similarity of −1, independent of their magnitudes. Output from the fuzzy distance algorithm, an alternate means to measure distance between the code and natural language text vectors, would be added to the training model to improve search engine results. "Fuzzy distance algorithm" refers to any of a class of well-known algorithms for calculating a similarity between fuzzy sets. A fuzzy set is a collection (e.g., a vector) in which elements are assigned a degree of membership, as opposed to binary membership criteria in which membership of an element in a set is either true or false. In classical set theory, the membership of elements in a set is assessed in binary terms according to a bivalent condition—an element either belongs or does not belong to the set. By contrast, fuzzy sets admit the gradual assessment of the membership of elements in a set. The fuzzy sets are useful when information about elements' membership in the sets is incomplete or imprecise. Any of many well-known fuzzy distance algorithms known in the art may be utilized for this purpose.

As a means of training the recurrent neural network 150 may make use of backpropagation logic 152.

Figure 2:
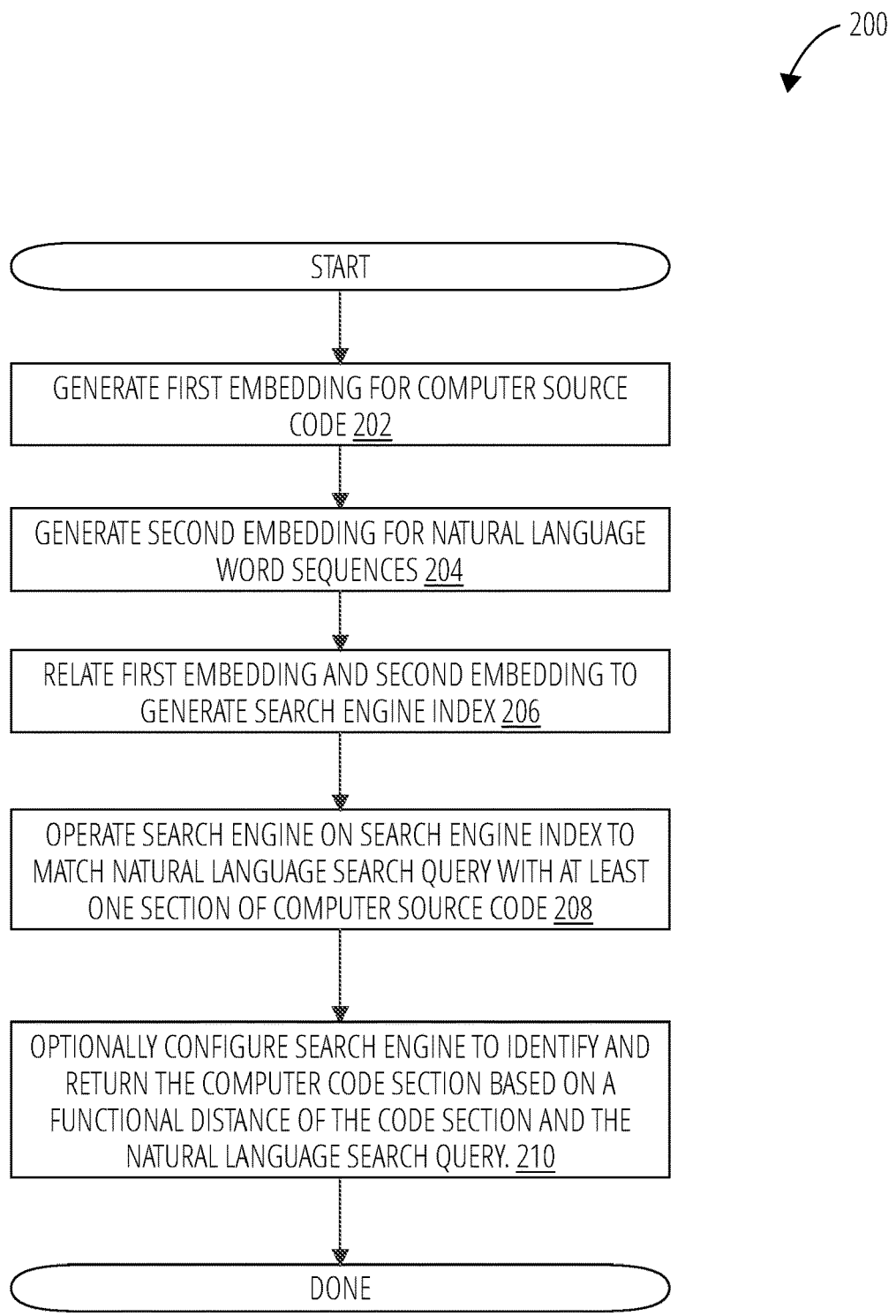
FIG. 2 depicts a process 200 in accordance with one embodiment.

At a high level, the system 100 may operate according to the process 200 depicted in FIG. 2.

Referring now to FIG. 2, a process 200 is depicted for matching natural language queries to computer code sections. In block 202, the process 200 generates a first embedding for computer source code. In block 204, the process 200 generates a second embedding for natural language word sequences. In block 206, the process 200 relates the first embedding and the second embedding to generate a search engine index. In block 208, the process 200 operates a search engine on the search engine index to match a natural language search query with at least one section of computer source code. In block 210, the search engine is configured by the process 200 to identify and return the computer code section based on a functional distance of the code section and the natural language search query.

Figure 3:
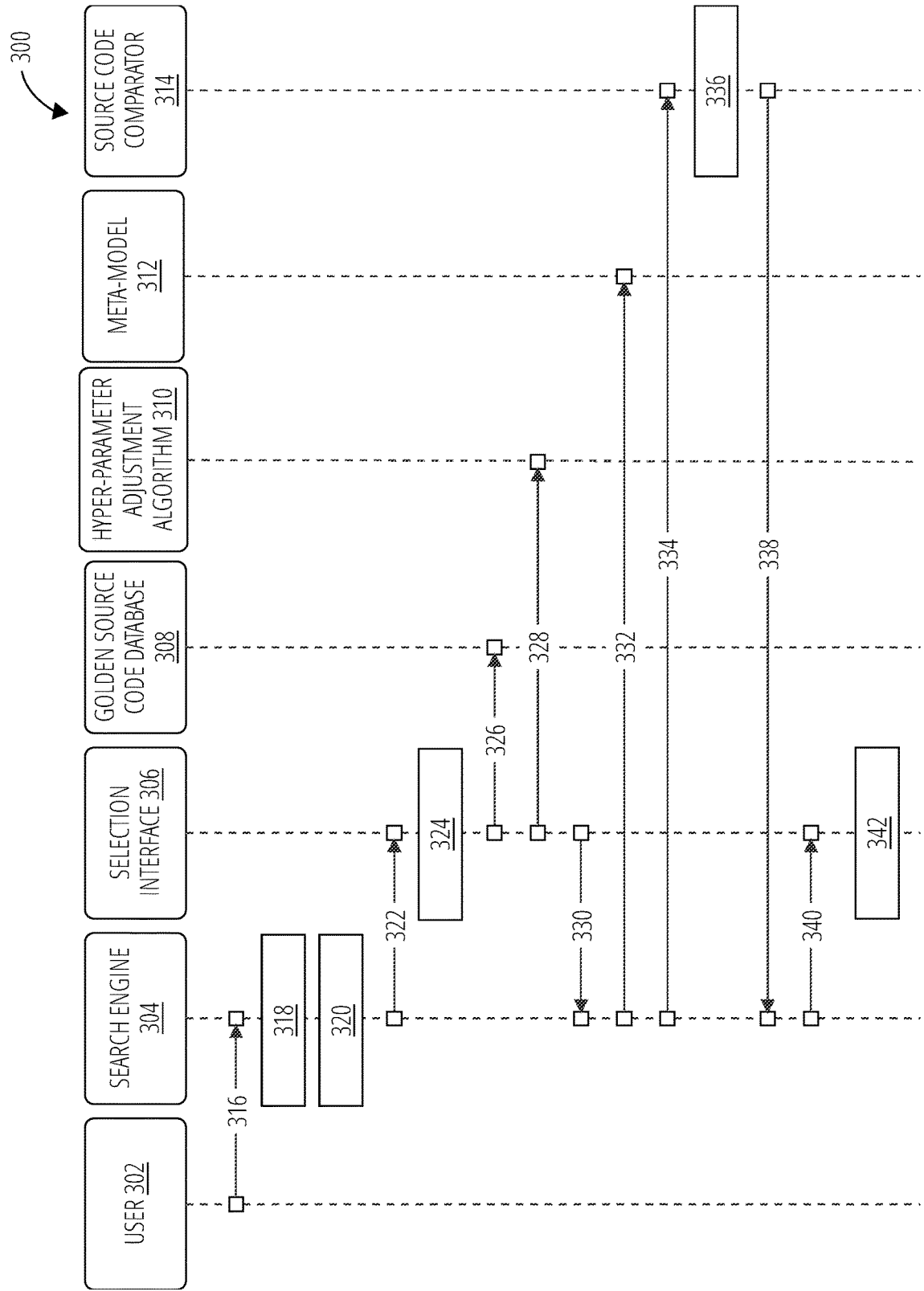
FIG. 3 depicts a process 300 in accordance with one embodiment.

FIG. 3 illustrates a process 300 for searching for computer code sections using a natural language interface and generating a hierarchical user interface. Beginning with the user 302, a natural language search query 316 is communicated (e.g., from the plug-in of an integrated development environment during the coding process) by the user 302 to a search engine 304. The search engine 304 proceeds to perform a vector distance algorithm 318 (which could be fuzzy) to compare the distance between computer code sections and natural language text vectors and apply the distance to a search index and a meta-model 320. The search engine 304 then passes the matching code section results 322 to the selection interface 306. The selection interface 306 proceeds to receive a user selection of a code section 324 and pass both the selected code section 326 from the user to the golden source code database 308 and the selected code section 328 from the user to the hyper-parameter adjustment algorithm 310. The selection interface 306 additionally returns the selected code section 330 to the search engine 304.

The search engine 304 also sends adjustments 332 as necessary to the meta-model 312. The search engine 304 then sends the selected code section 334 to the source code comparator 314. The source code comparator 314 serves to identify related code sections 336. When related code sections 338 are sent to the source code comparator 314 and related code sections 340 to the selection interface 306, the selection interface 306 can now display new tree level with related code sections 342 to the selected code section 334. Many possible embodiments for the tree level diagram for displaying and expanding on the results from the source code comparator 314, including a "find similar" function, will be readily familiar to those skilled in the art.

Software Embodiments

Embodiments of the system(s) disclosed herein, e.g., the system 100, or particular components thereof, may in some embodiments be implemented as software comprising instructions executed on one or more programmable device. By way of example, components of the disclosed systems may be implemented as an application, an app, drivers, or services. "Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

Various terms in the software arts are used herein and may be understood as follows. "Machine language" refers to instructions in a form that is directly executable by a programmable device without further translation by a compiler, interpreter, or assembler. In digital devices, machine language instructions are typically sequences of ones and zeros. "Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions. "Object code" refers to the computer code output by a compiler or as an intermediate output of an interpreter. Object code often takes the form of machine language or an intermediate language such as register transfer language (RTL).

"Source code" refers to a high-level textual computer language that requires either interpretation or compilation in order to be executed by a device. "Programmable device" refers to any logic (including hardware and software logic) having operational behavior that is configurable with instructions. "Instructions" refers to symbols representing commands for execution by a device using a processor, microprocessor, controller, interpreter, or other programmable logic. Broadly, 'instructions' can mean source code, object code, and executable code. 'Instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Computer code" refers to any of source code, object code, or executable code. "Interpreted computer code" refers to instructions in a form suitable for execution by an interpreter. "Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Driver" refers to low-level logic, typically software, that controls components of a device. Drivers often control the interface between an operating system or application and input/output components or peripherals of a device, for example. "Module" refers to a computer code section having defined entry and exit points. Examples of modules are any software comprising an application program interface, drivers, libraries, functions, and subroutines. "Application program interface" refers to instructions implementing entry points and return values to a module.

"Computer code section" refers to one or more instructions. "Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system. "Function" refers to a section of a program, a type of procedure or routine, that performs a specific task. Some programming languages make a distinction between a function, which returns a value, and a procedure, which performs some operation but does not return a value. However herein the term 'function' is used synonymously with 'subroutine.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'. "Task" refers to one or more operations that a process performs. "Process" refers to software that is in the process of being executed on a device.

"Interpreter" refers to logic that directly executes instructions written in a source code scripting language, without requiring the instructions to a priori be compiled into machine language. An interpreter translates the instructions into another form, for example into machine language, or into calls to internal functions and/or calls to functions in other software modules. "Compiler" refers to logic that transforms source code from a high-level programming language into object code or in some cases, into executable code.

In one particular embodiment, the system is implemented as a service that executes as one or more processes, modules, subroutines, or tasks on a server device so as to provide the described capabilities to one or more client devices over a network. However the system need not necessarily be accessed over a network and could, in some embodiments, be implemented by one or more app or applications on a single device or distributed between a mobile device and a computer, for example.

Figure 4:
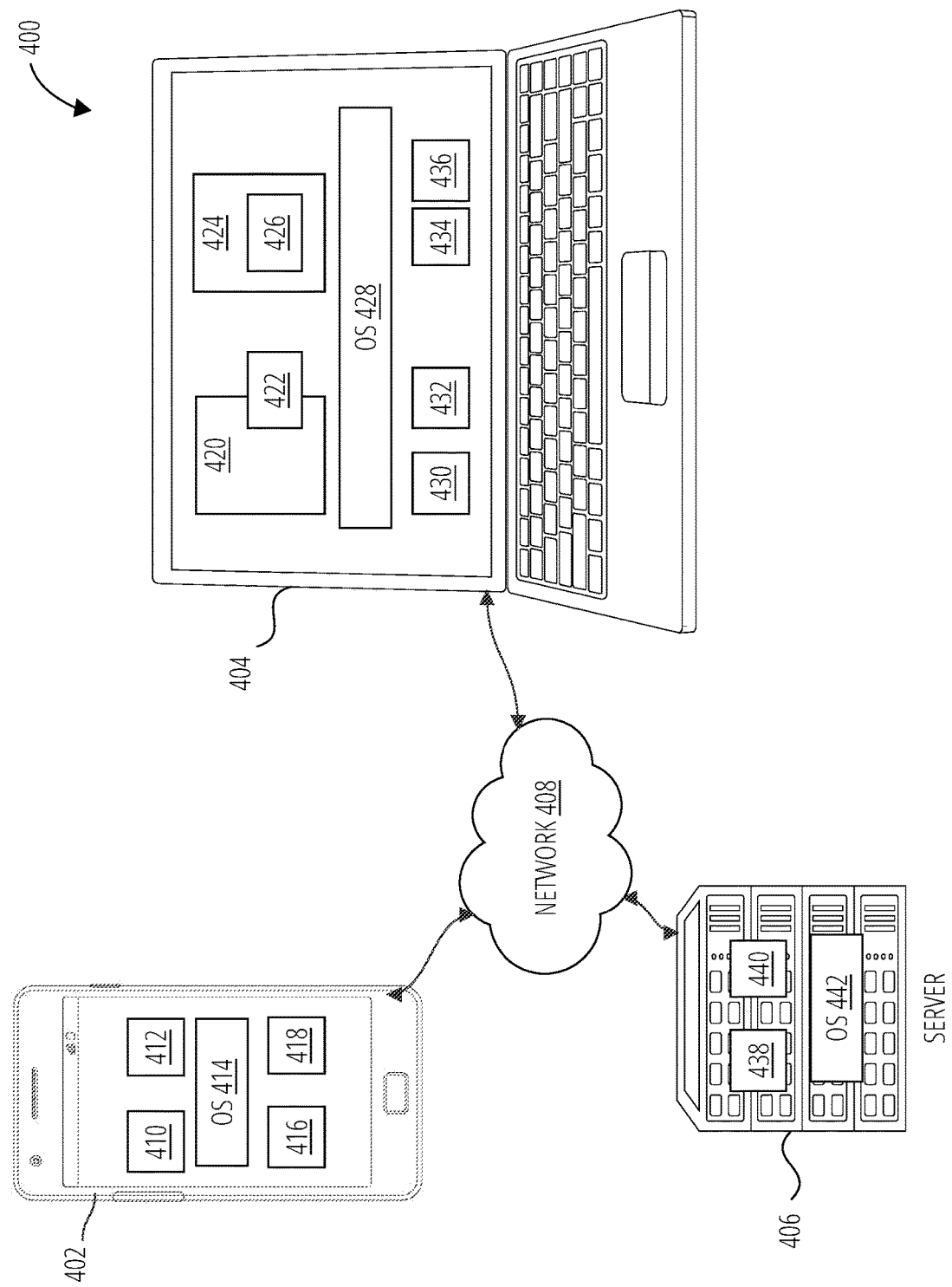
FIG. 4 depicts a client server network configuration 400 in accordance with one embodiment.

Referring to FIG. 4, a client server network configuration 400 illustrates various computer hardware devices and software modules coupled by a network 408 in one embodiment. Each device includes a native operating system, typically pre-installed on its non-volatile RAM, and a variety of software applications or apps for performing various functions.

The mobile programmable device 402 comprises a native operating system 414 and various apps (e.g., app 410 and app 412). A computer 404 also includes an operating system 428 that may include one or more library of native routines to run executable software on that device. "Library" refers to a collection of modules organized such that the functionality of all the modules may be included for use by software using references to the library in source code.

The computer 404 also includes various executable applications (e.g., application 420 and application 424). The mobile programmable device 402 and computer 404 are configured as clients on the network 408. A server 406 is also provided and includes an operating system 442 with native routines specific to providing a service (e.g., service 440 and service 438) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. "Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". "Linker" refers to logic that inputs one or more object code files generated by a compiler or an assembler and combines them into a single executable, library, or other unified object code output. One implementation of a linker directs its output directly to machine memory as executable code (performing the function of a loader as well). The distinct file comprising the executable would then be available for use by the computer 404, mobile programmable device 402, and/or server 406. Any of these devices may employ a loader to place the executable and any associated library in memory for execution. The operating system executes the program by passing control to the loaded program code, creating a task or process. An alternate means of executing an application or app involves the use of an interpreter (e.g., interpreter 426).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 416 or driver 418 on the mobile programmable device 402 or computer 404 (e.g., driver 430 and driver 432) might enable wireless headphones to be used for audio output(s) and a camera to be used for video inputs. Any of the devices may read and write data from and to files (e.g, file 434 or file 436) and applications or apps may utilize one or more plug-in (e.g., plug-in 422) to extend their capabilities (e.g., to encode or decode video files).

The network 408 in the client server network configuration 400 can be of a type understood by those skilled in the art, including a Local Area Network (LAN), Wide Area Network (WAN), Transmission Communication Protocol/Internet Protocol (TCP/IP) network, and so forth. These protocols used by the network 408 dictate the mechanisms by which data is exchanged between devices.

Machine Embodiments

Figure 5:
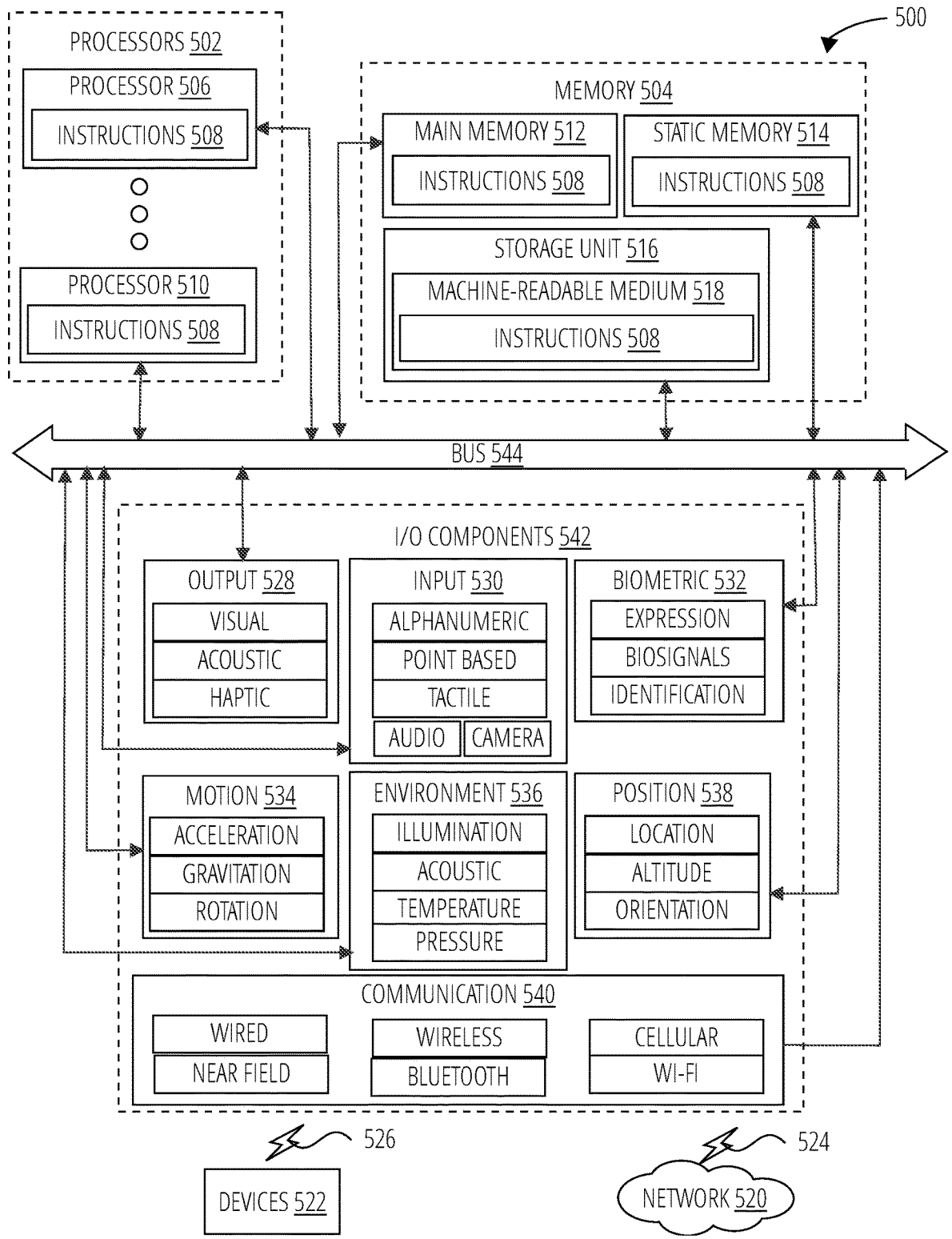
FIG. 5 depicts a machine 500 in the form of a computer system within which a set of instructions may be executed for causing the machine to perform any one or more of the methodologies discussed herein, according to an example embodiment.

FIG. 5 depicts a diagrammatic representation of a machine 500 in the form of a computer system within which logic may be implemented to cause the machine to perform any one or more of the functions or methods disclosed herein, according to an example embodiment. "Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

Specifically, FIG. 5 depicts a machine 500 comprising instructions 508 (e.g., a program, an application, an applet, an app, or other executable code) for causing the machine 500 to perform any one or more of the functions or methods discussed herein. For example the instructions 508 may cause the machine 500 to perform the process 200 and/or process 300. The instructions 508 configure a general, non-programmed machine into a particular machine 500 programmed to carry out said functions and/or methods.

In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is depicted, the term "machine" shall also be taken to include a collection of machines 200 that individually or jointly execute the instructions 508 to perform any one or more of the methodologies or subsets thereof discussed herein.

The machine 500 may include processors 502, memory 504, and I/O components 542, which may be configured to communicate with each other such as via one or more bus 544. In an example embodiment, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 506 and processor 510) to execute the instructions 508. The term "processor" is intended to include multi-core processors that may comprise two or more independent processors (sometimes referred to as "cores") that may execute instructions contemporaneously. Although FIG. 5 depicts multiple processors 502, the machine 500 may include a single processor with a single core, a single processor with multiple cores (e.g., a multi-core processor), multiple processors with a single core, multiple processors with multiples cores, or any combination thereof.

The memory 504 may include one or more of a main memory 512, a static memory 514, and a storage unit 516, each accessible to the processors 502 such as via the bus 544. The main memory 512, the static memory 514, and storage unit 516 may be utilized, individually or in combination, to store the instructions 508 embodying any one or more of the functionalities described herein. The instructions 508 may reside, completely or partially, within the main memory 512, within the static memory 514, within a machine-readable medium 518 within the storage unit 516, within at least one of the processors 502 (e.g., within the processor's cache memory), or any suitable combination thereof, during execution thereof by the machine 500.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones will likely include a touch input device or other such input mechanisms, while a headless server machine will likely not include such a touch input device. It will be appreciated that the I/O components 542 may include many other components that are not shown in FIG. 5. The I/O components 542 are grouped according to functionality merely for simplifying the following discussion and the grouping is in no way limiting. In various example embodiments, the I/O components 542 may include output components 528 and input components 530. The output components 528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 542 may include biometric components 532, motion components 534, environmental components 536, or position components 538, among a wide array of possibilities. For example, the biometric components 532 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 may include acceleration sensor components (e.g., accelerometer), gravitation sensor components, rotation sensor components (e.g., gyroscope), and so forth. The environmental components 536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 may include communication components 540 operable to couple the machine 500 to a network 520 or devices 522 via a coupling 524 and a coupling 526, respectively. For example, the communication components 540 may include a network interface component or another suitable device to interface with the network 520. In further examples, the communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 504, main memory 512, static memory 514, and/or memory of the processors 502) and/or storage unit 516 may store one or more sets of instructions and data structures (e.g., software) embodying or utilized by any one or more of the methodologies or functions described herein. These instructions (e.g., the instructions 508), when executed by processors 502, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories and optical and magnetic media, including memory internal or external to processors and internal or external to computer systems. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 520 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 520 or a portion of the network 520 may include a wireless or cellular network, and the coupling 524 may be a Code Division Multiple Access (CDMA) connection, a Global System for Mobile communications (GSM) connection, or another type of cellular or wireless coupling. In this example, the coupling 524 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 508 and/or data generated by or received and processed by the instructions 508 may be transmitted or received over the network 520 using a transmission medium via a network interface device (e.g., a network interface component included in the communication components 540) and utilizing any one of a number of well-known transfer protocols (e.g., hypertext transfer protocol (HTTP)). Similarly, the instructions 508 may be transmitted or received using a transmission medium via the coupling 526 (e.g., a peer-to-peer coupling) to the devices 522. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 508 for execution by the machine 500, and/or data generated by execution of the instructions 508, and/or data to be operated on during execution of the instructions 508, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
    a commented source code parser to extract source code comments from commented source code;
    a source code classifier to receive source code corresponding to the commented source code;
    a natural language classifier to receive the source code comments from the commented source code parser;
    a search engine operative on a search engine index associating outputs of the source code classifier and the natural language classifier to match a natural language search query with at least one code section in the source code;
    a relational model disposed between the source code classifier and the natural language classifier; and
    logic to apply a hyper-parameter adjustment algorithm on outputs of the search engine to adjust one or more hyper-parameters of one or both of the source code classifier and the natural language classifier, wherein a hyper-parameter of a classifier comprises a parameter that determines one of a number of layers in the classifier and a learning rate of the classifier.

2. The system of claim 1, wherein the search engine is configured to identify and return the code section based on a functional distance of the code section and the natural language search query.

3. The system of claim 1, wherein the search engine comprises a vector comparator.

4. The system of claim 3, wherein the search engine further comprises a fuzzy distance algorithm.

5. The system of claim 1, further comprising:
    a plug-in to activate the search engine from within an integrated development environment.

6. The system of claim 5, the plug-in configured to train a meta-model and to update a golden source code database.

7. The system of claim 5, the plug-in configured to operate the hyper-parameter adjustment algorithm on both of the source code classifier and the natural language classifier.

8. The system of claim 1, further comprising:
    logic to simultaneously train the source code classifier and the natural language classifier on separate (a) source code, and (b) source code comments each extracted from the commented source code.

9. The system of claim 1, wherein a recurrent neural network implementing one or both of the source code classifier and the natural language classifier applies back-propagation to learn from results of the search engine.

10. A method comprising:
    generating a first embedding for source code;
    generating a second embedding for natural language word sequences derived from source code comments of the source code;
    relating the first embedding and the second embedding to generate a search engine index;
    operating a search engine on the search engine index to match a natural language search query with at least one code section of the source code;
    using a relational model for relating the first embedding and the second embedding to generate the search engine index; and
    applying a hyper-parameter adjustment algorithm on outputs of the search engine to adjust at least one hyper-parameter of both of a source code classifier utilizing the first embedding and a natural language classifier utilizing the second embedding, wherein a hyper-parameter of a classifier comprises a parameter that determines one of a number of layers in the classifier and a learning rate of the classifier.

11. The method of claim 10, wherein the search engine is configured to identify and return the code section based on a functional distance of the code section and the natural language search query.

12. The method of claim 10, wherein the search engine comprises a vector comparator.

13. The method of claim 12, wherein the search engine further comprises a fuzzy distance algorithm.

14. The method of claim 10, further comprising:
    a plug-in to activate the search engine from within an integrated development environment.

15. The method of claim 14, the plug-in configured to train a meta-model and to update a golden source code database.

16. The method of claim 14, the plug-in configured to operate the hyper-parameter adjustment algorithm on the source code classifier and on the natural language classifier.

17. The method of claim 10, further comprising:
    logic to simultaneously train the source code classifier and the natural language classifier on (a) the source code, and (b) the source code comments each extracted from the commented source code.

18. The method of claim 10, wherein a recurrent neural network is trained using backpropagation.

* * * * *